US012570507B2

(12) United States Patent
Hawkins et al.

(10) Patent No.: US 12,570,507 B2
(45) Date of Patent: Mar. 10, 2026

(54) FLOOR SERVICE JACK

(71) Applicant: VIS, LLC, Travelers Rest, SC (US)

(72) Inventors: Caleb Coleman Hawkins, Travelers Rest, SC (US); Robert Fox, Travelers Rest, SC (US); Patrick Livingston, Campobello, SC (US)

(73) Assignee: VIS, LLC, Travelers Rest, SC (US)

( * ) Notice: Subject to any disclaimer, the term of this patent is extended or adjusted under 35 U.S.C. 154(b) by 289 days.

(21) Appl. No.: 18/204,206

(22) Filed: May 31, 2023

(65) Prior Publication Data

US 2023/0391590 A1 Dec. 7, 2023

Related U.S. Application Data

(60) Provisional application No. 63/349,682, filed on Jun. 7, 2022.

(51) Int. Cl.
*B66F 5/04* (2006.01)
*B66F 5/02* (2006.01)

(52) U.S. Cl.
CPC ................ *B66F 5/04* (2013.01); *B66F 5/025* (2013.01); *B66F 2700/055* (2013.01)

(58) Field of Classification Search
CPC ....... B66F 5/04; B66F 5/025; B66F 2700/055
See application file for complete search history.

(56) References Cited

U.S. PATENT DOCUMENTS 3,807,694 A * 4/1974 Butorac .................... B66F 5/04 254/8 B
3,907,262 A * 9/1975 Bonnaure ................. C22B 1/20 266/179
4,008,778 A * 2/1977 Mitchell ................... B66F 5/04 254/8 B
4,131,263 A * 12/1978 John ......................... B66F 5/04 254/8 B
4,334,667 A * 6/1982 Fox ........................... B66F 5/04 251/251
4,513,950 A * 4/1985 Yamagishi ................ B66F 5/04 254/8 B (Continued)

FOREIGN PATENT DOCUMENTS

EP 2602064 B1 2/2019
EP 3517251 B1 6/2022

(Continued)

OTHER PUBLICATIONS

Screen shot of "Electric Car Jack Kit 5 Ton Car Floor Electric Jack Hydraulic 12V Multifunctional Emergency Car Lift JackTool Kit Tire Inflator and LED Flashlight, Electric Impact Wrench"; 3 pages; https://www.amazon.com/dp/B07D13CW86/ref=sspa_dk_detail_3?pd_rd_i=B07D13CW86&pd_rd_w=0sKz4&pf_rd_p=9fd3ea7c-b77c-42ac-b43b-c872d3f37c38&pd_rd_wg=jcKT7&pf_rd_r=DJMT8XVK0Z5RA53NG4K8&pd_rd_r=63fe03ad-41b1-48fd-b98c-9c384278362d&spLa=ZW5jcnlwdGVkUXVhbGlmaWVyPUEzNTA5MFY0WIdTVU5YJmVuY3J5cHRIZEIkPUEwMTK3MzY5MVIVVDITMENWOFJaWCZIbmNyeXB0ZWRBZEikPUEwNjEyNTEyM1JNTU8wNTE2MUpHSyZ3aWRnZXROYW1IPXNwX2RIdGFpbCZhY3Rpb249Y2xpY2tSZWRpcmVjdCZkb05vdExvZ0NsaWNrPXRydWU&th=1.*

(Continued)

*Primary Examiner* — Seahee Hong
(74) *Attorney, Agent, or Firm* — Thrive IP

(57) ABSTRACT

A floor service jack includes a battery and a control panel provided at a distal end of a handle of the jack for electro-mechanically or hydraulically controlling a lift arm to raise and lower a vehicle for servicing without exposure to an undercarriage of the vehicle to replace the battery or to operate the control panel.

15 Claims, 5 Drawing Sheets

(56) References Cited

U.S. PATENT DOCUMENTS 4,596,378 A * 6/1986 Liang .......... B66F 5/04 254/8 B
4,678,162 A * 7/1987 Yang .......... B66F 5/04 254/93 H
4,775,132 A * 10/1988 Yang .......... B66F 5/04 254/93 H
4,796,861 A 1/1989 Petty
4,964,617 A * 10/1990 Lawrence .......... B66F 5/04 254/133 R
5,681,029 A * 10/1997 Reesor .......... B66F 5/04 254/93 H
D404,006 S 1/1999 Clowers et al.
6,722,634 B1 * 4/2004 Hsu .......... B66F 5/04 254/8 R
7,055,801 B2 * 6/2006 Tatsumi .......... B66F 5/04 254/8 B
7,157,882 B2 1/2007 Johnson et al.
7,157,883 B2 1/2007 Johnson et al.
7,164,257 B2 1/2007 Johnson et al.
7,176,654 B2 2/2007 Meyer et al.
7,253,585 B2 8/2007 Johnson et al.
7,262,580 B2 8/2007 Meyer et al.
7,273,159 B2 9/2007 Brotto
7,321,219 B2 1/2008 Meyer et al.
7,323,847 B2 1/2008 Meyer et al.
7,342,381 B2 3/2008 Johnson et al.
7,401,764 B1 * 7/2008 Castillo .......... B66F 5/04 254/93 H
7,425,816 B2 9/2008 Meyer et al.
7,492,124 B2 2/2009 Johnson et al.
7,504,804 B2 3/2009 Johnson et al.
7,508,167 B2 3/2009 Meyer et al.
7,554,290 B2 6/2009 Johnson et al.
7,557,535 B2 7/2009 Johnson et al.
7,589,500 B2 9/2009 Johnson et al.
7,667,437 B2 2/2010 Johnson et al.
7,714,538 B2 5/2010 Johnson et al.
7,791,318 B2 9/2010 Johnson et al.
7,941,865 B2 5/2011 Seman et al.
7,944,173 B2 5/2011 Johnson et al.
7,944,181 B2 5/2011 Johnson et al.
7,952,326 B2 5/2011 Johnson et al.
7,999,510 B2 8/2011 Johnson et al.
8,018,198 B2 9/2011 Meyer et al.
8,154,249 B2 4/2012 Johnson et al.
8,207,702 B2 6/2012 Johnson et al.
8,228,036 B2 7/2012 Meyer
8,269,459 B2 9/2012 Johnson et al.
8,436,584 B2 5/2013 Johnson et al.
8,450,971 B2 5/2013 Johnson et al.
8,471,532 B2 6/2013 Johnson et al.
8,500,095 B1 * 8/2013 Salcedo .......... B66F 5/025 254/93 H
8,653,790 B2 2/2014 Johnson et al.
8,890,468 B2 11/2014 Bauer
D718,705 S 12/2014 Naksen
9,041,322 B2 5/2015 Shimizu et al.
9,278,837 B2 * 3/2016 Aristi Artolazabal .... B66F 5/04
9,379,569 B2 6/2016 Johnson et al.
9,676,599 B1 * 6/2017 Baker .......... B66F 5/04
9,746,860 B2 8/2017 Sakaue et al.
10,027,078 B2 7/2018 Knight
10,276,844 B2 4/2019 Wackwitz et al.
10,300,591 B2 5/2019 Rejman et al.
10,553,843 B2 2/2020 Reese et al.
10,688,644 B2 6/2020 Iida et al.
10,727,007 B2 7/2020 Xu et al.
10,827,655 B2 11/2020 Truettner et al.
10,972,041 B2 4/2021 White et al.
11,031,728 B2 6/2021 Louis et al.
11,062,859 B1 7/2021 Jordan et al.
11,114,878 B2 9/2021 Hansen et al.
11,133,662 B2 9/2021 Friedman et al.
11,145,929 B2 10/2021 Altenburger
11,179,787 B2 11/2021 Yoshida et al.
11,251,623 B2 2/2022 Kohler et al.
11,331,783 B2 5/2022 Tanaka et al.
11,465,268 B2 10/2022 Zhu et al.
11,495,929 B1 11/2022 Murray
11,523,510 B2 12/2022 Silha et al.
11,540,429 B2 12/2022 Silha et al.
D978,786 S 2/2023 Osmola et al.
11,837,694 B2 12/2023 Johnson et al.
D1,013,634 S 2/2024 Cagle
11,964,856 B1 4/2024 Rourk
2006/0112570 A1 6/2006 Serdynski et al.
2006/0208240 A1 9/2006 Spittle et al.
2007/0279000 A1 12/2007 Lucero
2009/0236183 A1 9/2009 Bordwell et al.
2011/0024705 A1 * 2/2011 Fox .......... B66F 5/04 254/93 H
2012/0048588 A1 3/2012 Iyoda et al.
2014/0326934 A1 * 11/2014 Zhou .......... B66F 5/04 254/2 B
2018/0090964 A1 3/2018 Williams
2018/0198292 A1 7/2018 Lee et al.
2018/0311807 A1 11/2018 Sergyeyenko et al.
2020/0156910 A1 * 5/2020 Tijerina .......... B66F 5/04
2021/0292143 A1 9/2021 Luinge
2022/0344952 A1 10/2022 Siverhus et al.
2022/0356053 A1 11/2022 Perlstein et al.
2022/0371865 A1 * 11/2022 Horn .......... B66F 5/04
2023/0107939 A1 4/2023 LaDouceur
2023/0202811 A1 6/2023 Karleskint et al.
2023/0283091 A1 9/2023 Olsson et al.
2023/0291049 A1 9/2023 Varipatis et al.
2023/0402857 A1 12/2023 Robinson et al.
2023/0405792 A1 12/2023 Cox et al.
2024/0006700 A1 1/2024 Fassbender et al.
2024/0022096 A1 1/2024 Hegemann
2024/0106052 A1 3/2024 Nishikawa
2024/0146082 A1 5/2024 Downes
2024/0170739 A1 5/2024 Fauteux et al.
2024/0190685 A1 6/2024 Hawkins et al.
2024/0234907 A1 7/2024 Panosian et al.
2024/0234910 A1 7/2024 Panosian et al.
2024/0234911 A1 7/2024 Panosian et al.
2024/0347286 A1 10/2024 Abbott et al.

FOREIGN PATENT DOCUMENTS

EP 2554335 B1 3/2023
EP 3476267 B1 7/2023
EP 4144484 B1 5/2024
EP 4410490 A1 8/2024
EP 4438235 A1 10/2024
EP 4438236 A1 10/2024
ES 1061163 U 1/2006
WO 2017189786 A1 11/2017
WO 2022128874 A1 6/2022
WO 2022172776 A1 8/2022
WO 2023102164 A1 6/2023
WO 2023232138 A1 12/2023
WO 2023244518 A1 12/2023

OTHER PUBLICATIONS

[item U continued] a7c-b77c-42ac-b43b-c872dcf37c38&pd_rw_wg=jcKT7&pf_rd_r=DJMT8XVK0Z5RA53NG4K8pd_rd_r=63fe03ad-41b1-48fd-b98c-9c384278362d&spLa=ZW5jcnlwdGVkUXVhbGlmaWVyPUEzNTA5MFY0WldTVU5YJmVuY3J5cHRlZElkPUEwMTk3MZY5MVlVDITMENWOFJaWCZlbmNyeXB0ZWRBZEyNTEyM1JTU8wNTEM2UpHSyZ3aWRnZXROYW1IPXNwX.*
[item V continued] 2RldGFpbCZhY3Rp249Y2xpY2tSZWRpcmVjdCZkb05vdExZ0NsaWNrPXRydWU&th=1.*
Screen shot of "Electric Car Jack or Jack Set 2 Ton by ROGTZ DC 12v All-in-one Automatic Sedan Lift Scissor Jack Car Repair Tool, Jack Set"; 3 pages; https://www.amazon.com/Electric-ROGTZ-Automatic-Vehicle-Scissor/dp/B07567XFJC/ref=asc_df_

(56) References Cited

OTHER PUBLICATIONS

B07567XFJC/?tag=hyprod-20&linkCode=df0&hvadid=385121954544&hvpos=&hvnetw=g&hvrand=15559069307377824593&hvpone=&hvptwo=&hvqmt=&hvdev=c&hvdvcmdi=&hvlocint=&hvlocphy=9010457&hvtargid=pla-832913658180&psc=1&tag=&ref=&adgrpid=76842158285&hvpone=&hvptwo=&hvadid=385121954544&hvpos=&hvnhvnetw=g&hvrand=15559069307377824593&hvqmt=&hvdev=c&hvdvcmdl=&hvlocint=&hvlocphy=9010457&hvtargid=pla-832913658180.*

[item X Continued] =& hvnetw=g&hvrand=15559069307377824593&hvpone=&hvptwo=&hvqmt=& hvdev=c&hvdvcmdl=&hvlocint=&hvlocphy=9010457&hvttargid=pla-832913658180&psc=1&tag=&ref=&adgrpid=76842158285&hvpone=&hvptwo=&hvadid=385121954544&hvpos=hvn.*

[item U continued] hvnetw=g&hvrand=1559069307377B24593&hvmt=&hvdev=c&hvdvcmdl=&hvlocint=&hvlocphy=9010457&hvtargid=pla-832913658180.*

Screen shot of "The Electric Jack"; 3 pages; https://agm-products.com/products/the-electric-jack?variant=32802919350360&currency=USD&utm_medium=product_sync&utm_source=google&utm_content=sag_organic&utm_campaign=sag_organic&gclid=Cj0KCQjwplmTBhCmARIsAKr58cwagWFByPJnoELDCCmBF21jZNjGZK6uKKTriNRaooBXbL93tjrcbJQaAh60EALw_wcB.

International Search Report issued in PCT/US24/25396; Issued: Aug. 22, 2024; 8 pages.

Machine Translation of ES 1061163 U; Published: Jan. 1, 2006; 1 page.

Screenshot of Milwaukee M12 Battery; https://www.milwaukeetool.com/products/batteries-and-chargers/m12-batteries- and-chargers; 5 pages.

Screenshot of Milwaukee M18 Battery; https://www.milwaukeetool.com/Innovations/solutions?system=mx-fuel; 7 pages.

Screenshot of Dewalt 12V Max; https://www.dewalt.com/systems/cordless-platforms/12v; 5 pages.

Seenshot of Dewalt 20V Max https://www.dewalt.com/products/accessories/batteries-chargers/batteries; 10 pages.

* cited by examiner

FLOOR SERVICE JACK

CROSS REFERENCE TO RELATED APPLICATIONS

This utility patent application claims benefit of U.S. Provisional Patent Application Ser. No. 63/349,682 filed in the United States Patent and Trademark Office on Jun. 7, 2022, which is incorporated in its entirety by reference thereto.

BACKGROUND OF THE DISCLOSURE

Professional vehicle repair, maintenance, and service facilities use a variety of tools to service vehicles. Among such tools are service jacks that usually include pivotal arms and saddles with very low profiles to permit insertion and operation under vehicles with low ground clearances. Known service jacks suffer from a variety of drawbacks.

A manually operated service jack, for instance, requires actuating its lifting mechanism using a handle, which requires continuous physical force from an operator to raise a vehicle to a desired height to service the vehicle. Alternatively, pneumatic service jacks use pressurized air to activate their hydraulic systems to engage lifting mechanisms. Pneumatic jacks require much less physical force to operate, but the necessary pressurized air employ air-lines, which, when running across shop floors from a pressurized air source to the jacks, can become tripping hazards.

Although cordless, rechargeable, battery-operated hand tools, such as drills, ratchets, and impact wrenches, are used by professional vehicle repair, maintenance, and service shops, a sufficiently compact, battery-operated jack has not been provided. More specifically, battery-operated jacks heretofore would require large motors and transfer cases to provide sufficient torque to rotate drive screws to raise lift arms of such jacks. The relatively large components result in oversized jacks that occupy excessive floor space and are more difficult to maneuver around a shop and under a vehicle. Moreover, if a battery-operated jack loses its charge at an inopportune time, a technician may have to reach under the vehicle to replace the battery. Still further, battery-operated jacks with operating switches on their lift arms may also require a technician to enter under vehicles to activate such switches.

What is needed in the industry is a compact, portable, battery-operated, rechargeable, electric or electro-hydraulic jack that does not require manual activation, power cords, or air-lines. Moreover, the needed jack should have sufficient battery and torque capabilities to make it easier, more convenient, and safer to handle and manipulate. The jack also should have a battery and an operating switch readily accessible to a technician outside of an unsupported vehicle.

BRIEF SUMMARY OF THE DISCLOSURE

The present disclosure is directed to compact, portable, rechargeable, battery-operated service jacks that employ electro-mechanical lifting devices and/or hydraulic pumps. More specifically, the electro-mechanical and electro-hydraulic lifting devices disclosed herein do not require manual operation by handles nor do they require electricity from electrical outlets or pressure via shop airlines. Furthermore, hydraulics employed in some aspects use relatively low internal pressure, preferably not to exceed ten thousand pounds per square inch (10,000 psi).

In one embodiment according to the disclosure, an electro-hydraulic floor service jack may include a frame having a plurality of wheels attached thereto; a lift arm having a saddle depending therefrom, the lift arm rotatably disposed in the frame; a handle having a proximal end and a distal end, the proximal end movably attached to the frame; a battery disposed proximate the distal end of the handle; a control switch in electrical communication with the battery, the control switch disposed proximate the distal end of the handle; an electro-hydraulic pump disposed proximate the frame, the electro-hydraulic pump in electrical communication with the battery; and a hydraulic cylinder connected to the lift arm and being in hydraulic communication with the electro-hydraulic pump, wherein, when the control switch is activated, the battery powers the electro-hydraulic pump, the powered electro-hydraulic pump thereby charging the hydraulic cylinder to cause the lift arm to raise or lower the saddle.

The battery of the electro-hydraulic floor service jack may be removable and rechargeable and may further include a charging port to recharge the battery while it remains in place at the distal end of the handle.

In a further aspect, the electro-hydraulic floor service jack may include a grip attached to the distal end of the handle with the control switch positioned on or near the grip for easy access by a user. Additionally, the grip and the wheels can be used to position the frame relative to an undercarriage of a vehicle. A saddle may be installed or connected on the lift arm to contact a portion of the undercarriage of the vehicle for lifting the vehicle.

An internal pressure of the hydraulic cylinder of the electro-hydraulic floor service jack may vary according to user or situational needs but preferably does not exceed ten thousand pounds per square inch when charged by the electro-hydraulic pump. Also in this aspect, an electrical line may be provided to connect the electro-hydraulic pump and the battery. Similarly, a hydraulic line may be provided to connect the electro-hydraulic pump and the hydraulic cylinder.

In another aspect of the disclosure, an electric motor floor jack is provided in which lifting arms are responsive to a threaded rod which in turn is engaged by an electric motor. The floor jack may include a substantially rectangular frame having a central longitudinal axis; a forward end for housing the floor jack; a middle portion for retaining a lifting mechanism; a rearward end for housing a power unit; a bottom thereof having an elongated rectangular slot opening at the forward end having a pair of separated elongated extensions for straddling the floor jack and retaining the floor jack in the slot opening; and a rearward portion having a thread rod positioned along the longitudinal center thereof, a pair of longitudinal flanges extending upwardly from the bottom sides of the frame, with each flange having a "U" shaped retaining channel facing inwardly and attached horizontally along the middle portion of the frame, and having a pair of wheels rotatably attached to the exterior sides of the flanges near the forward end of the frame; a pair of lift arms acting in parallel having forward ends, central portions and rearward ends and interconnected at the rearward ends thereof by trunnions lateral push bar, and with the respective end of the trunnions slidably retained within the respective retaining channel of the frame; and with the forward ends of the lift arms extendable upwardly at the forward end of the frame; a pair of connecting arms acting in parallel having forward ends and rearward ends with the respective forward end pivotally connected near the forward end of the respective flange of the frame, and with the respective rearward end pivotally connected near the central portion of the respective lift arm; an electric motor engaging the threaded rod so that when the rod is rotated, the rearward ends of the lift arms are translated forward along the longitudinal retaining channels in the flanges of the frame and the forward ends of the lift arms are extended upwardly at the forward end of the frame; and a tubular handle at the rearward end of the frame having a T-bar hand grip at the proximal end thereof and a yoke at the distal end thereof including a lateral axel with the ends thereof pivotally attached to the respective sides of the rearward end of the frame.

In yet another embodiment of the disclosure, a floor service jack may include a frame having a plurality of wheels attached thereto, the frame being configured for positioning under a vehicle; a lift arm having a saddle depending therefrom, the lift arm rotatably disposed proximate the frame; a handle having a proximal end and a distal end, the proximal end movably attached to the frame, the distal end being spaced apart from under the vehicle; a battery disposed proximate the distal end of the handle; a control switch in electrical communication with the battery, the control switch disposed proximate the distal end of the handle; a motor disposed proximate the frame, the motor in electrical communication with the battery; and a drive mechanism, such as a screw drive. connected to the lift arm, wherein, when the control switch is activated, the battery powers the motor to cause the drive mechanism to raise or lower the saddle. The lift arm of the floor service jack may be at least two lift arms that scissor relative to each other to raise or lower the saddle.

Also in this aspect, the battery may be removable and/or rechargeable. More particularly, a charging port may be installed at or around the distal end of the handle to recharge the battery.

In another embodiment, a floor service jack may include a frame having a plurality of wheels attached thereto, the frame being configured for positioning under a vehicle; a lift arm having a saddle depending therefrom, the lift arm rotatably disposed proximate the frame; a handle having a proximal end and a distal end, the proximal end movably attached to the frame, the distal end being spaced apart from under the vehicle; a battery disposed proximate the distal end of the handle, which may include a charging port to recharge the battery; a control switch in electrical communication with the battery, the control switch disposed proximate the distal end of the handle; and an operating assembly connected to the lift arm, wherein, when the control switch is activated, the battery powers the operating assembly to raise or lower the saddle.

The operating assembly may include a screw drive and/or a motor for moving the lift arm. Additionally or alternatively, the operating assembly may include a hydraulic cylinder connected to the lift arm for moving the lift arm. Still further, the operating assembly may include an electro-hydraulic pump in communication with the hydraulic cylinder, wherein, when the control switch is activated, the battery powers the electro-hydraulic pump to operate the hydraulic cylinder and change a position of the lift arm, i.e., lower or higher.

Additional objects and advantages of the present subject matter are set forth in, or will be apparent to, those of ordinary skill in the art from the description herein. Also, it should be further appreciated that modifications and variations to the specifically illustrated, referenced, and discussed features, processes, and elements hereof may be practiced in various embodiments and uses of the disclosure without departing from the spirit and scope of the subject matter.

Variations may include, but are not limited to, substitution of equivalent means, features, or steps for those illustrated, referenced, or discussed, and the functional, operational, or positional reversal of various parts, features, steps, or the like. Those of ordinary skill in the art will better appreciate the features and aspects of the various embodiments, and others, upon review of the remainder of the specification.

BRIEF DESCRIPTION OF THE DRAWINGS

A full and enabling disclosure of the present subject matter, including the best mode thereof directed to one of ordinary skill in the art, is set forth in the specification, which refers to the appended figures, wherein.

DETAILED DESCRIPTION OF THE DISCLOSURE

Figure 1:
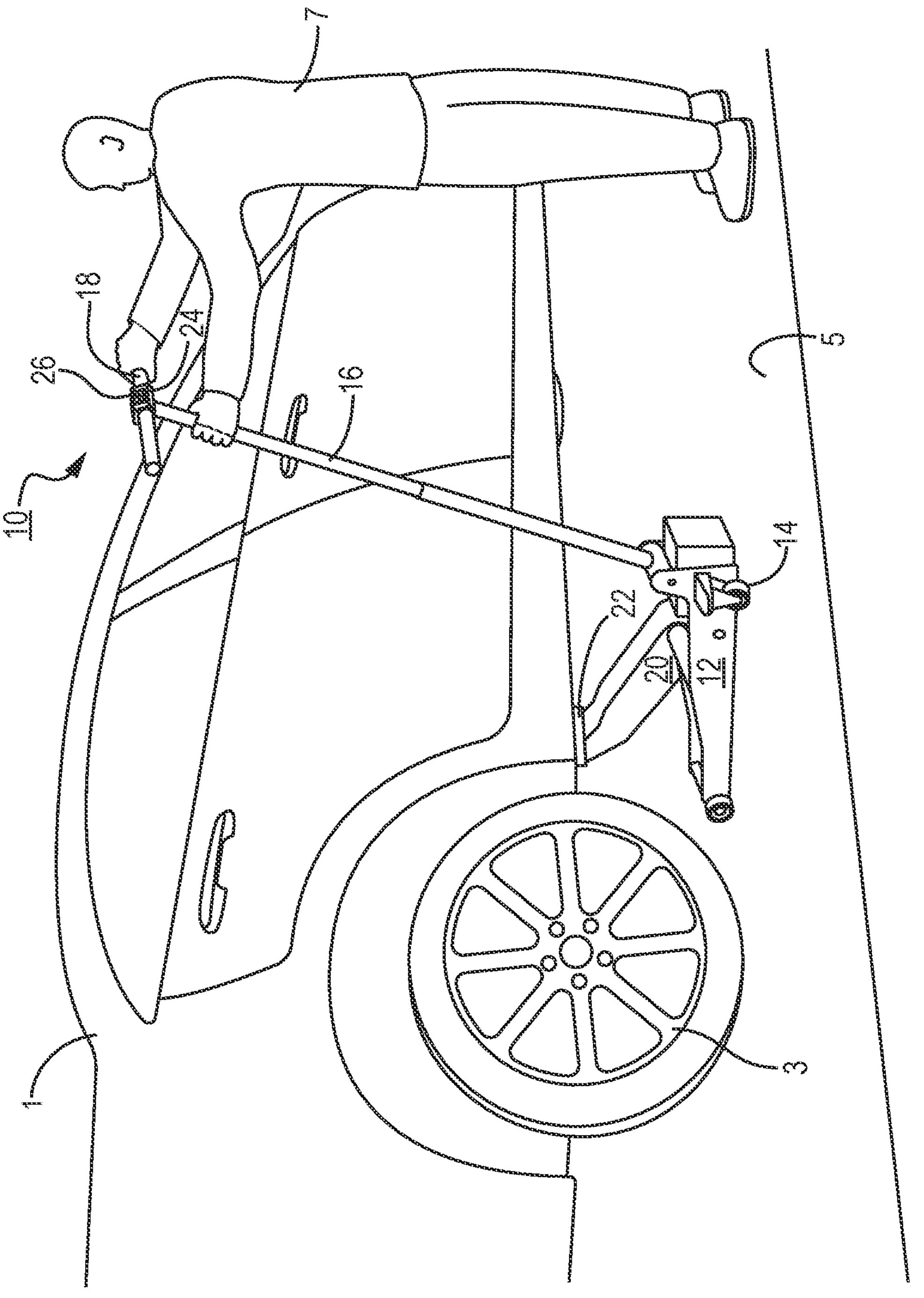
FIG. 1 is a partial perspective view of an exemplary floor jack shown in an intended use environment according to an aspect of the disclosure.

As required, detailed embodiments are disclosed herein; however, the disclosed embodiments are merely examples and may be embodied in various forms. Therefore, specific structural and functional details disclosed herein are not to be interpreted as limiting, but merely as a basis for the claims and as a representative basis for teaching one skilled in the art to variously employ the exemplary embodiments of the present disclosure, as well as their equivalents.

Unless defined otherwise, all technical, engineering, and scientific terms used herein have the same meaning as is commonly understood by one of ordinary skill in the art to which this disclosure belongs. In the event that there is a plurality of definitions for a term, phrase, or acronym herein, those in this section prevail unless stated otherwise.

Wherever the phrase "for example," "such as," "including," and the like are used herein, the phrase "and without limitation" is understood to follow unless explicitly stated otherwise. Similarly, "an example," "exemplary," and the like are understood to be non-limiting.

The term "substantially" allows for deviations from the descriptor that do not negatively impact the intended purpose. Descriptive terms are understood to be modified by the term "substantially" even if the word "substantially" is not explicitly recited.

The term "about" when used in connection with a numerical value refers to the actual given value, and to the approximation to such given value that would reasonably be inferred by one of ordinary skill in the art, including approximations due to the experimental and or measurement conditions for such given value.

The terms "comprising" and "including" and "having" and "involving" (and similarly "comprises", "includes," "has," and "involves") and the like are used interchangeably and have the same meaning. Specifically, each of the terms is defined consistent with the common United States patent law definition of "comprising" and is therefore interpreted to be an open term meaning "at least the following," and is also interpreted not to exclude additional features, limitations, aspects, et cetera. Thus, for example, “a device having components a, b, and c” means that the device includes at least components a, b, and c. Similarly, a phrase such as: “a method involving a, b, and c” means that the method includes at least steps a, b, and c.

Where a list of alternative component terms is used, e.g., “a structure such as ‘a’, ‘b’, ‘c’, ‘d’ or the like,” or “a or b,” such lists and alternative terms provide meaning and context for the sake of illustration, unless indicated otherwise. Also, relative terms such as “first,” “second,” “third,” “front,” and “rear” are intended to identify or distinguish one component or feature from another similar component or feature, unless indicated otherwise herein.

Unless the context clearly requires otherwise, throughout the description and the claims, the words “comprise,” “comprising,” and the like are to be construed in an inclusive sense as opposed to an exclusive or exhaustive sense; in the sense of “including, but not limited to.”

The various embodiments of the disclosure and/or equivalents falling within the scope of present disclosure overcome or ameliorate at least one of the disadvantages of the prior art or provide a useful alternative.

Detailed reference will now be made to the drawings in which examples embodying the present subject matter are shown. The detailed description uses numerical and letter designations to refer to features of the drawings. The drawings and detailed description provide a full and written description of the present subject matter, and of the manner and process of making and using various exemplary embodiments, so as to enable one skilled in the pertinent art to make and use them, as well as the best mode of carrying out the exemplary embodiments. The drawings are not necessarily to scale, and some features may be exaggerated to show details of particular components. Thus, the examples set forth in the drawings and detailed descriptions are provided by way of explanation only and are not meant as limitations of the disclosure. The present subject matter thus includes any modifications and variations of the following examples as come within the scope of the appended claims and their equivalents.

Turning now to FIG. 1, a cordless, electro-hydraulic, floor service jack shown in exemplary operation is broadly designated by element number 10. The floor service jack 10 may include a mobile frame 12 with wheels 14, a handle 16, and grips 18 positioned at a distal end of the handle 16 with a proximal end of the handle 16 being rotatably connected to the frame 12. Also shown in this example, a lift arm 20 and a saddle 22 extend from the frame 12 to elevate a vehicle 1 and its tire 3 above ground 5 by an operator or technician 7 operating the lift arm 20. More specifically, a battery 24 is activated by the technician 7 using a control switch 26 located on or near the grips 18, which in turn activates the lift arm 20 as discussed in greater detail with respect to FIGS. 2 and 3 below.

Figure 2:
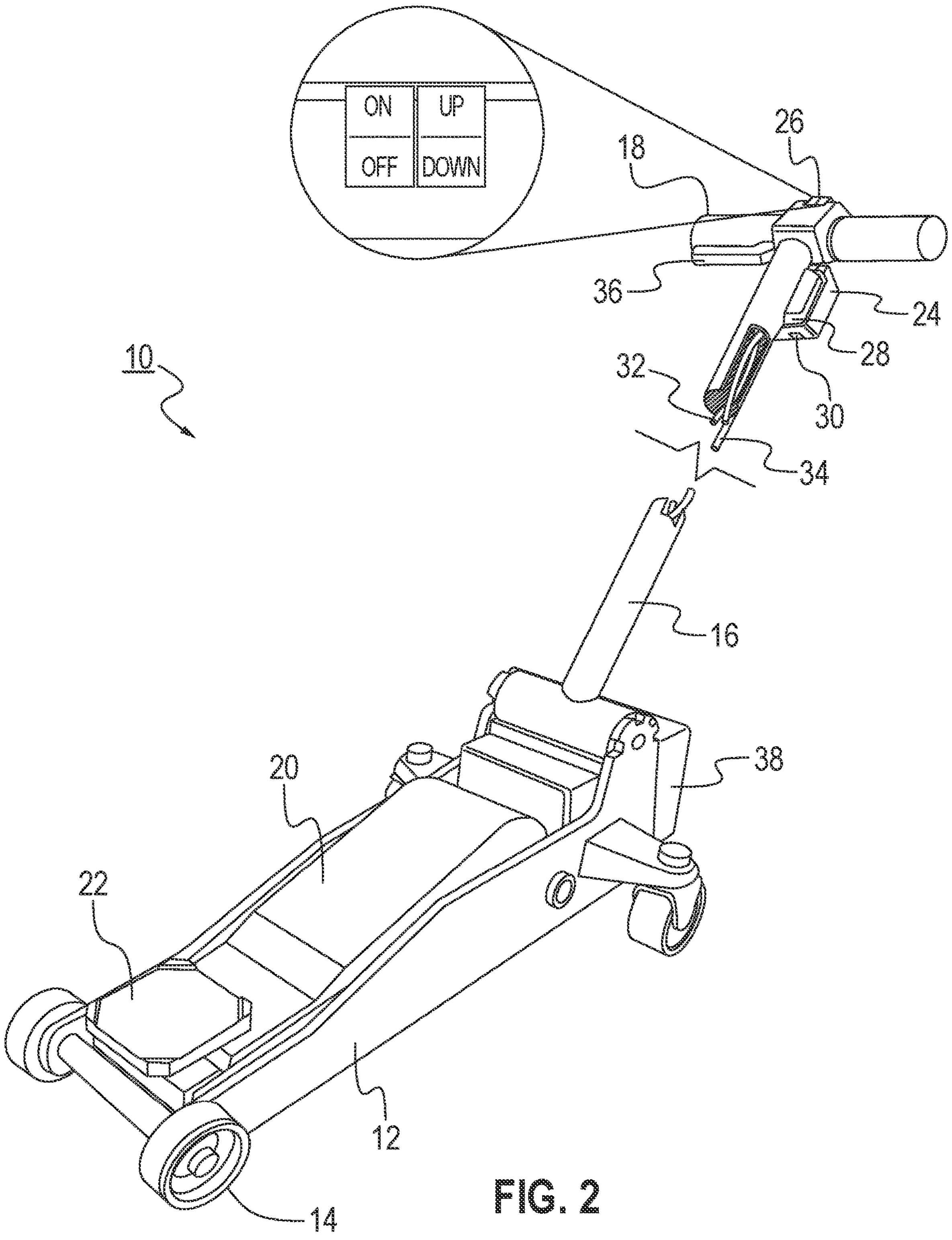
FIG. 2 is a partial, sectional, perspective view of the floor jack as in FIG. 1, particularly showing a control panel at a distal end of a handle.

FIG. 2 most clearly shows the floor service jack 10 and its mobile frame 12. The wheels 14, the handle 16, and the grips 18 are used to roll and steer the service jack 10 into a desired position under the vehicle 1 (see FIG. 1). Here, the lift arm 20 and the saddle 22 are shown in a first relaxed or stored state within the frame 12. Once the floor service jack 10 is in a desirable position under the vehicle 1, the battery 24 can be activated using the control switch 26 introduced above. The battery 24, which is located at the distal end of the handle 16, may be removably attached to a battery connector 28. The battery connector 28 may be magnetic, snap-on, slide-in, or combinations of these and other types of connections for receiving the battery 24. The battery connector 28 may further include a battery charging port 30 and may be or include a printed circuit board (not shown) that is in electrical communication with the lift arm 20 via electrical lines 32. Here also, a positioning lever linkage rod 34 is shown within the handle 16 to elevate or lower the handle 16 using a handle positioning lever 36.

As shown in an enlarged inset in FIG. 2, the control switch 26 may include toggles, switches, push buttons, dials, or the like in which one button, for instance, switches the battery 24 on or off by switching between “ON-OFF” and another button, for instance, controls power from the battery 24 to the lift arm 20 by switching between “UP-DOWN,” as further explained below.

Figure 3:
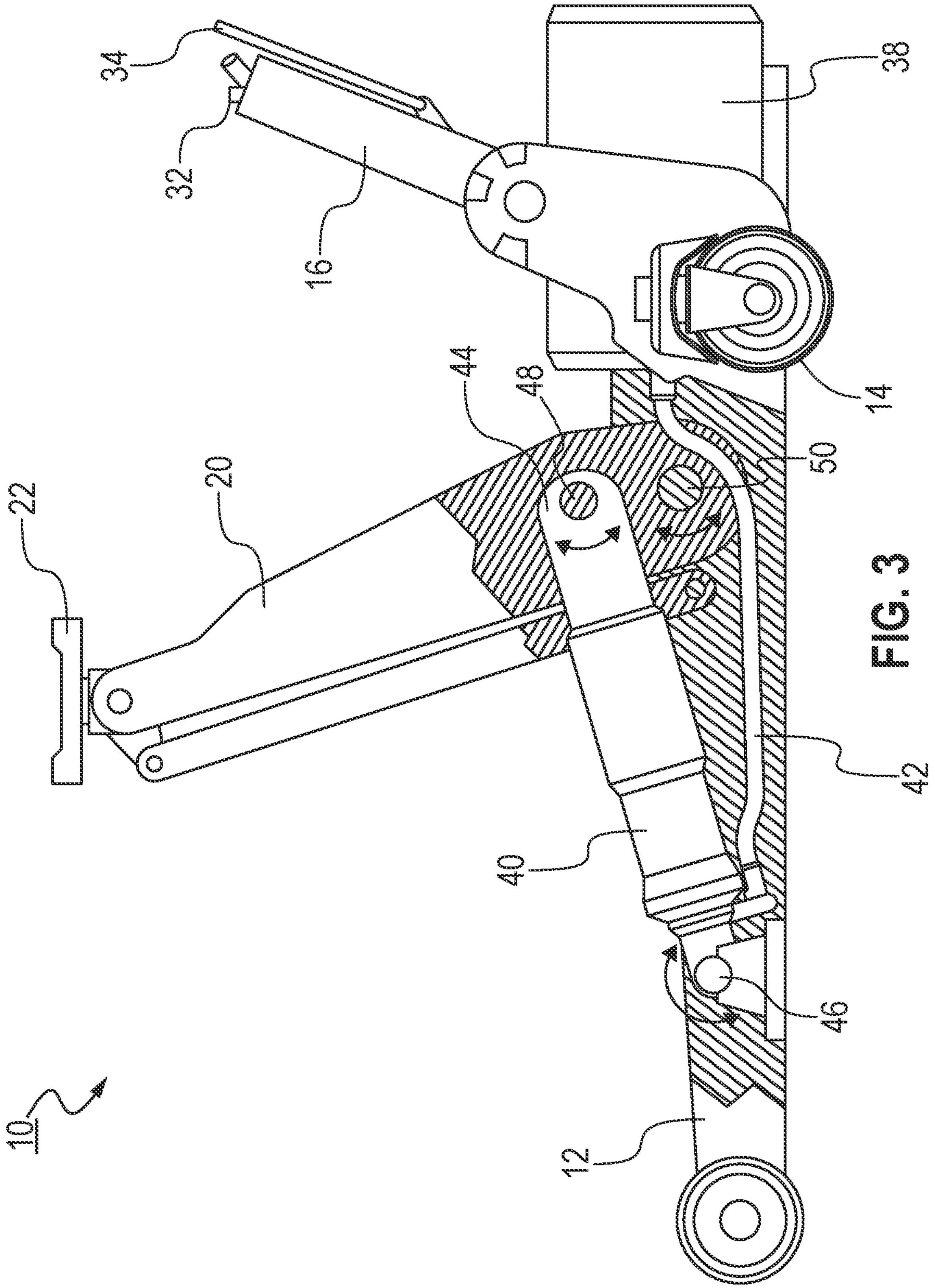
FIG. 3 is a partial, sectional, elevational view of the floor jack as in FIG. 1.

With reference to FIG. 3, the mobile frame 12, the handle 16, and the lift arm 20 of the floor service jack 10 are shown partly cutaway for clarity. Thus, the electrical lines 32 and the positioning lever linkage rod 34 can be seen within the handle 16 located above the wheels 14. More particularly, the lift arm 20 and the saddle 22 are in a second extended or activated state elevated above the frame 12. Also, shown positioned between the handle 16 and the wheels 14 is an electro-hydraulic pump 38. The pump 38 is in electrical communication with the battery 24 (see FIG. 2) and in hydraulic communication with a hydraulic cylinder 40 via a hydraulic hose or line 42, together an operating assembly. By way of example operation, when the switch 26 shown in FIG. 2 is turned ON and switched to “UP” or “elevate” or the like, electrical power is communicated from the battery 24 to the pump 38, which in turn charges the line 42 and sends hydraulic pressure to the hydraulic cylinder 40. Hydraulic pressure within the battery-powered exemplary cylinder 40 is preferably not greater than ten thousand pounds per square inch (10,000 psi). The charged cylinder 40 then changes a position of the lift arm 20, i.e., by raising or lowering a hydraulic ram piston 44 that in turn elevates or lowers the lift arm 20 via a series of rotatable linkages 46, 48, 50, as shown in schematic operation in FIG. 3 by double-headed arrows.

Thus, as described in detail above and shown in FIGS. 1-3, since the battery 24 and the operating switch 26 of the exemplary cordless, electro-hydraulic, floor service jack 10 are located on or near the grips 18 of its handle 16 and since those can be respectively changed and controlled from well outside of a vehicle, dangers associated with venturing beneath an unsupported vehicle are eliminated. Moreover, because the hydraulic ram piston 44 of the floor service jack 10 elevates its lift arm 20, a technician does not have to utilize manual force to raise the saddle 22 to lift a vehicle and tripping hazards due to electrical or pneumatic air lines are also eliminated.

Figure 4:
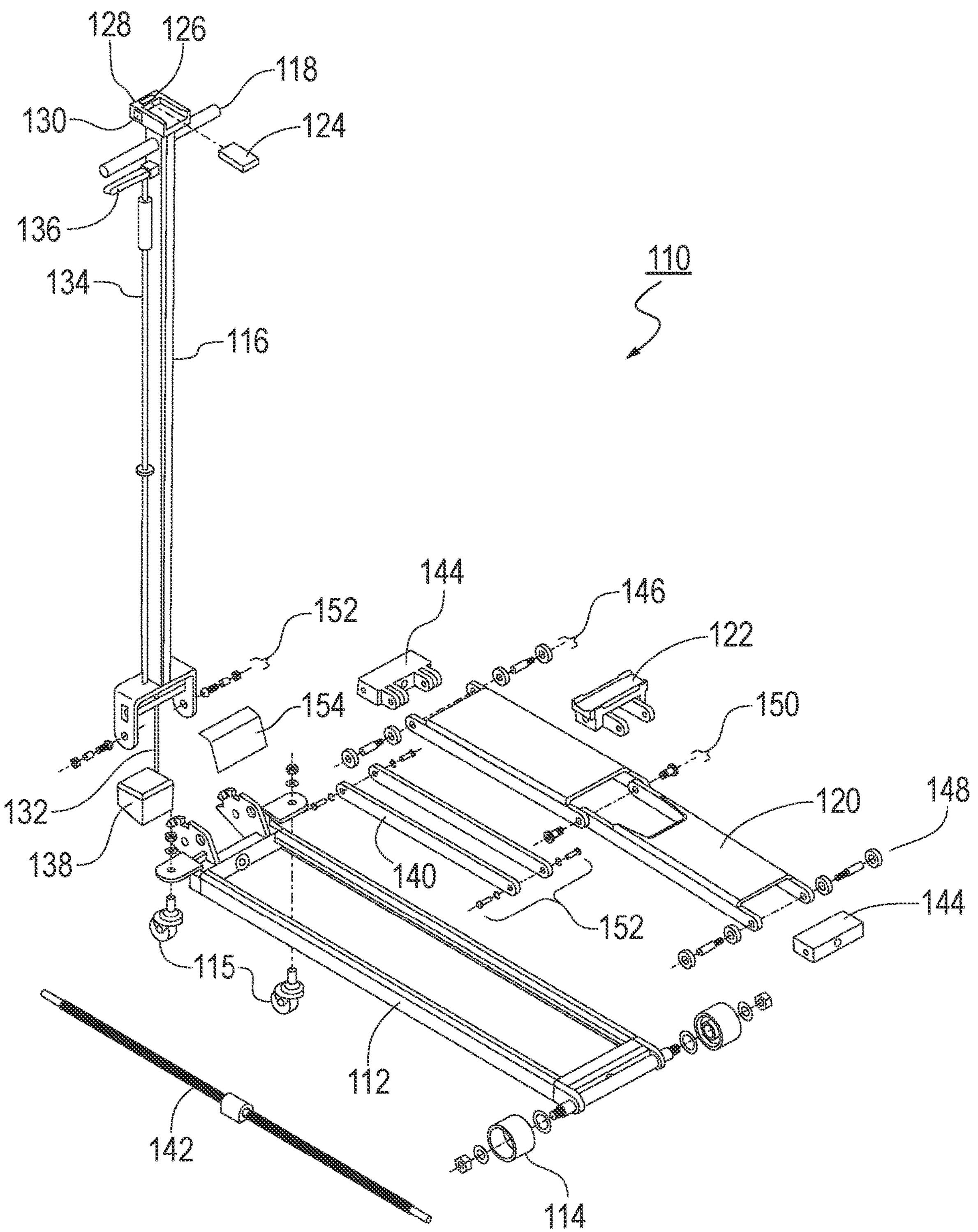
FIG. 4 is an exploded perspective view of another embodiment of a floor jack.
Figure 5:
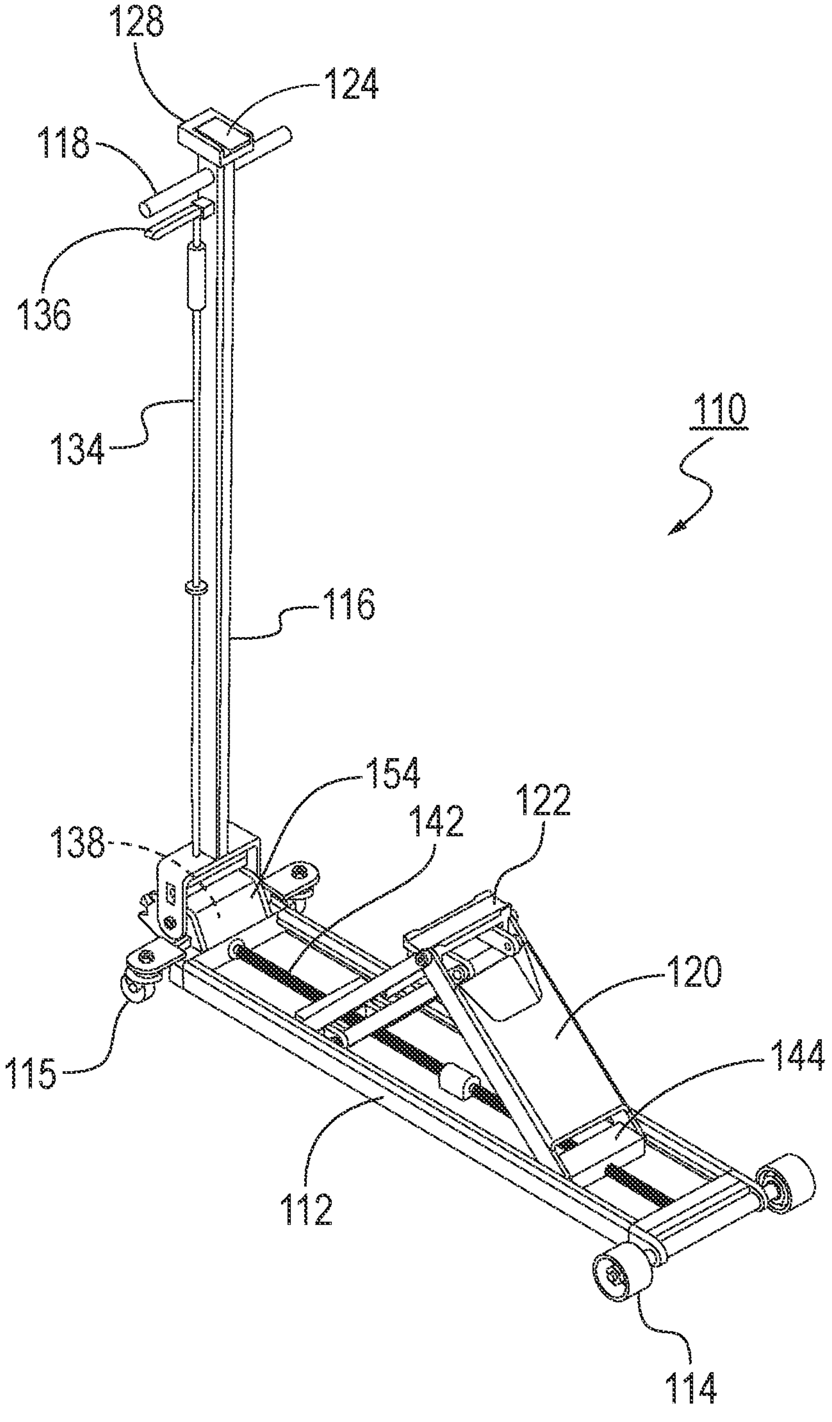
FIG. 5 is a perspective view of the floor jack as in FIG. 4.

FIGS. 4 and 5 show another embodiment of a floor jack, which is generally designated by element number 110 and operates by an electric motor 138, as explained in greater detail below. For clarity, the exemplary floor jack 110 is shown in an exploded view in FIG. 4 and includes a substantially rectangular frame or chassis 112, wheels 114 (at least one of which may be a steerable caster wheel 115), a handle 116, and grips 118, which are used to roll and steer the service jack 110 into a desired position under a vehicle (see, e.g., vehicle 1 in FIG. 1).

FIG. 4 particularly shows a set of scissoring lift arms 120 and a saddle 122 in shown in a first, relaxed, or flattened state. A rechargeable and/or removable battery 124 may be attached to or inserted in a battery receptacle or connector 128 that may be located at a distal end of the handle 116 for easy access by an operator. Here, the battery receptacle 128 can be magnetic, snap-on, slide-in, or combinations of these and other types of connections for receiving the battery 124 and may also include a battery charging port 130 for recharging the battery 124 without removing it from the receptacle 128. Further, a control switch or panel 126 may be attached to or can be integral with the battery connector 128. The control switch 126 is used to activate the battery 124 to raise and lower the saddle 122. More specifically, the battery connector 128 may include a printed circuit board (not shown) and electrical lines 132 to establish electrical communication between the control switch 126 and a motor 138 to drive the saddle 122, as explained in greater detail below.

Once the floor service jack 110 is in a desirable position under the vehicle, the saddle 122 can be raised and lowered as shown in FIG. 5 using the control switch 126 to activate the battery 124 via the electrical lines 132. More particularly, a lever linkage rod 134 is shown operably connected to a handle positioning lever 136 to adjust the handle 116, e.g., forward and backward using a pivot assembly 152, and to position the service jack 110 under the vehicle. Next, the activated control switch 126 sends an electrical signal from the battery 124 to the motor 138. The motor 138 is engages a drive screw 142, which may be referred to together as an operating assembly that changes a position of the guide arms 140 that in turn raises or lowers the lift arms 120 and the saddle 122.

As further shown in FIGS. 4 and 5, in response to movement of the drive screw 142, the lift arms 120 are raised and lowered by maneuvering trunnions 144 toward or away from each other via linkages or pivot assemblies 146 and 148, which also effects a pivoted movement between the lift arms 120 at pivot assembly 150 to raise or lower the saddle 122. In this example, the frame 112 may include two parallel arms between which the trunnions 144 reposition to elevate or lower the lift arms 120. In a particular aspect, a plate or cover 154 may be provided to shield the motor 138, and the frame 112 can be sufficiently short to prevent the lift arms 120 from flattening into a full horizontal position (i.e., 180 degrees) when the jack 110 is in its retracted or lowered state to minimize an initial torque required to begin raising the saddle 122 under a load.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

By way of example and not of limitation, exemplary embodiments as disclosed herein may include but are not limited to:

EMBODIMENT 1: An electro-hydraulic floor service jack comprising a frame having a plurality of wheels attached thereto; a lift arm having a saddle depending therefrom, the lift arm rotatably disposed in the frame; a handle having a proximal end and a distal end, the proximal end movably attached to the frame; a battery disposed proximate the distal end of the handle; a control switch in electrical communication with the battery, the control switch disposed proximate the distal end of the handle; an electro-hydraulic pump disposed proximate the frame, the electro-hydraulic pump in electrical communication with the battery; and a hydraulic cylinder connected to the lift arm and being in hydraulic communication with the electro-hydraulic pump, wherein, when the control switch is activated, the battery powers the electro-hydraulic pump, the powered electro-hydraulic pump thereby charging the hydraulic cylinder to cause the lift arm to raise or lower the saddle.

EMBODIMENT 2: The electro-hydraulic floor service jack as in embodiment 1, wherein the battery is removable and rechargeable.

EMBODIMENT 3: The electro-hydraulic floor service jack as in embodiments 1 or 2, wherein the battery includes a charging port to recharge the battery proximate the distal end of the handle.

EMBODIMENT 4: The electro-hydraulic floor service jack as in any of the foregoing embodiments, further comprising a grip attached to the distal end of the handle, the control switch further disposed proximate the grip.

EMBODIMENT 5: The electro-hydraulic floor service jack as in any of the foregoing embodiments, further comprising a grip attached to the distal end of the handle, the grip and the wheels being configured to position the frame proximate an undercarriage of a vehicle.

EMBODIMENT 6: The electro-hydraulic floor service jack as in any of the foregoing embodiments, further comprising a saddle disposed on the lift arm, the saddle being configured to contact an undercarriage of a vehicle for lifting the vehicle.

EMBODIMENT 7: The electro-hydraulic floor service jack as in any of the foregoing embodiments, wherein an internal pressure of the hydraulic cylinder does not exceed ten thousand pounds per square inch when charged by the electro-hydraulic pump.

EMBODIMENT 8: The electro-hydraulic floor service jack as in any of the foregoing embodiments, further comprising an electrical line connecting the battery and the electro-hydraulic pump.

EMBODIMENT 9: The electro-hydraulic floor service jack as in any of the foregoing embodiments, further comprising a hydraulic line connecting the electro-hydraulic pump and the hydraulic cylinder.

EMBODIMENT 10: An electric floor service jack comprising a frame, a handle, a power supply disposed on the handle, a control switch disposed proximate the power supply and in communication therewith, a threaded rod disposed in the frame, wheels disposed on the frame, lift arms connected by trunnions, the trunnions slidably retained within the frame, an electric motor engaged with the threaded rod such that the lift arms translate within the frame when the control switch is activated.

EMBODIMENT 11: The electric floor service jack as in embodiment 10, wherein the power supply is a battery.

EMBODIMENT 12: A floor service jack comprising a rectangular frame having a longitudinal axis; a lifting mechanism disposed proximate the frame; a motor; a threaded rod positioned along the longitudinal axis; a plurality of wheels rotatably attached to the frame; a pair of lift arms acting in parallel interconnected by trunnions with respective ends of the trunnions slidably retained within the frame, the lift arms being upwardly extendable from the frame; an electric motor engaging the threaded rod such that, when the rod is rotated, the lift arms translate along the longitudinal axis of the frame; and a tubular handle having a battery in communication with the motor to drive the threaded rod.

The invention claimed is:

1. A floor service jack, comprising:

a frame having a forward end and a rearward end, the frame including a plurality of wheels attached proximate the forward end, the frame being configured for positioning under a vehicle;

a lift arm having a saddle depending therefrom, the lift arm rotatably disposed in the frame;

a handle having a proximal end and a distal end, the proximal end movably attached to the frame, the distal end being spaced apart from the vehicle;

a battery disposed proximate the distal end of the handle;

a control switch in electrical communication with the battery, the control switch disposed proximate the distal end of the handle;

an electro-hydraulic pump disposed proximate the frame, the electro-hydraulic pump in electrical communication with the battery; and a hydraulic cylinder connected to the lift arm and being in hydraulic communication with the electro-hydraulic pump, wherein, when the control switch is activated, the battery powers the electro-hydraulic pump, the powered electro-hydraulic pump thereby charging the hydraulic cylinder to an internal pressure not exceeding ten thousand pounds per square inch to change a position of the lift arm and the saddle.

2. The floor service jack as in claim 1, wherein the battery is rechargeable and removably attachable to a battery receptacle disposed at the distal end of the handle.

3. The floor service jack as in claim 1, wherein the battery includes a charging port to recharge the battery proximate the distal end of the handle, the charging port further comprising a circuit board in electrical communication with the lift arm.

4. The floor service jack as in claim 1, further comprising a grip attached to the distal end of the handle, the control switch further disposed proximate the grip, and wherein the control switch further comprises a first button configured to control power to the battery and a second button configured to raise and lower the lift arm.

5. The floor service jack as in claim 1, further comprising a grip attached to the distal end of the handle, the grip and the wheels being configured to position the frame proximate an undercarriage of the vehicle.

6. The floor service jack as in claim 1, wherein the saddle is disposed on the lift arm, the saddle being configured to contact an undercarriage of the vehicle for lifting the vehicle, the lift arm and the saddle raised and lowered via interaction of the control switch, the battery, and the hydraulic cylinder.

7. The floor service jack as in claim 1, wherein the internal pressure of the hydraulic cylinder can be varied up to ten thousand pounds per square inch when charged by the electro-hydraulic pump.

8. The floor service jack as in claim 1, further comprising an electrical line connecting the battery and the electro-hydraulic pump.

9. The floor service jack as in claim 1, further comprising a hydraulic line connecting the electro-hydraulic pump and the hydraulic cylinder.

10. A floor service jack, comprising:

a frame having a forward end and a rearward end, the frame further comprising a plurality of wheels attached proximate the forward end, the frame being configured for positioning under a vehicle;

a lift arm having a saddle depending therefrom, the lift arm rotatably disposed proximate the frame;

a handle having a proximal end and a distal end, the proximal end movably attached to the frame, the distal end being spaced apart from under the vehicle;

a battery disposed proximate the distal end of the handle, the battery being rechargeable or changeable from the distal end when the frame is under the vehicle;

a control switch in electrical communication with the battery, the control switch disposed proximate the distal end of the handle; and an operating assembly connected to the lift arm, wherein, when the control switch is activated, the battery powers the operating assembly to adjust a position of the saddle.

11. The floor service jack as in claim 10, wherein the operating assembly includes a screw drive for moving the lift arm.

12. The floor service jack as in claim 10, wherein the operating assembly includes a motor for moving the lift arm.

13. The floor service jack as in claim 10, wherein the operating assembly includes a hydraulic cylinder connected to the lift arm, the hydraulic cylinder being configured to raise or lower the lift arm.

14. The floor service jack as in claim 10, wherein the operating assembly includes an electro-hydraulic pump and a hydraulic cylinder, wherein, when the control switch is activated, the battery powers the electro-hydraulic pump, the electro-hydraulic pump being in communication with the hydraulic cylinder to change the position of the lift arm.

15. The floor service jack as in claim 10, further comprising a charging port disposed proximate the distal end of the handle to recharge the battery, the charging port further comprising a circuit board in electrical communication with the lift arm.

* * * * *